Apr. 17, 1923.
C. F. WRAY
LUBRICATOR CUP
Filed April 14, 1921
1,451,854
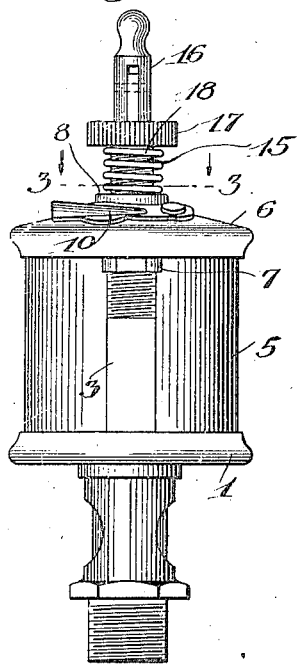
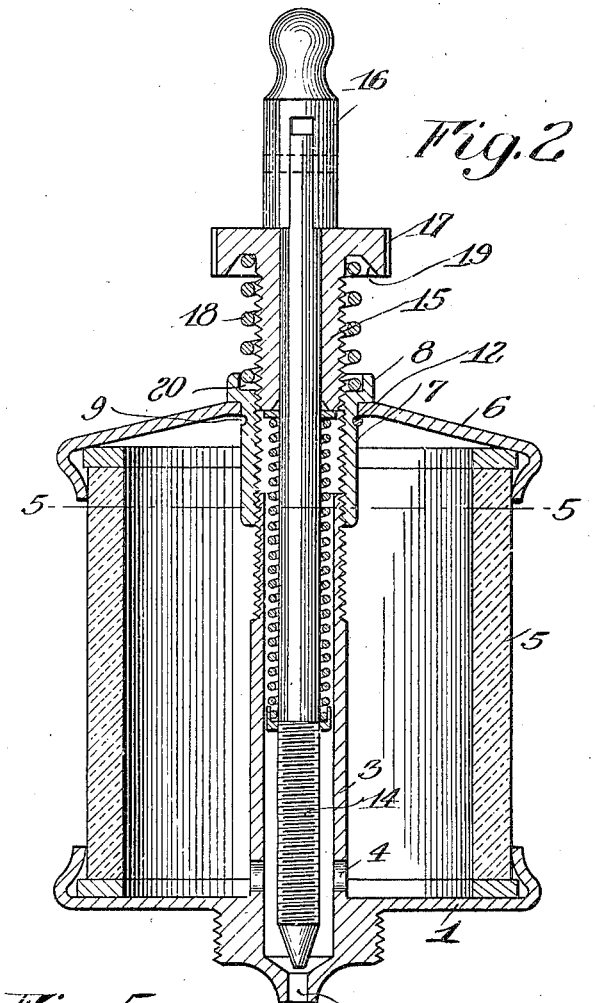
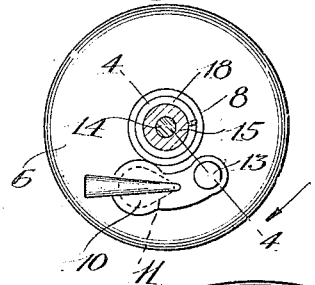
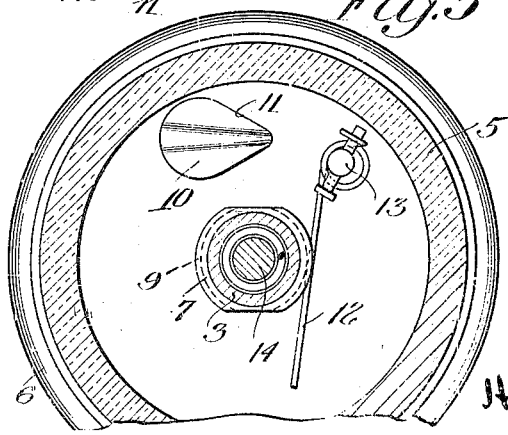
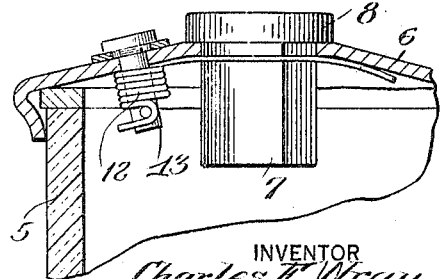
INVENTOR
Charles F. Wray
By Harold E. Stonebraker
his ATTORNEY Patented Apr. 17, 1923.

1,451,854

UNITED STATES PATENT OFFICE.

CHARLES F. WRAY, OF ROCHESTER, NEW YORK, ASSIGNOR TO THE NATIONAL BRASS MANUFACTURING COMPANY, OF ROCHESTER, NEW YORK, A CORPORATION OF NEW YORK.

LUBRICATOR CUP.

Application filed April 14, 1921. Serial No. 461,205.

*To all whom it may concern:*

Be it known that I, CHARLES F. WRAY, a citizen of the United States of America, residing at Rochester, in the county of Monroe and State of New York, have invented certain new and useful Improvements in Lubricator Cups, of which the following is a specification.

My invention relates to lubricator cups and has for its purpose to afford a simplified and economical construction, embodying an arrangement of such a nature that the parts can be readily manufactured and assembled, and also permitting the flow of oil from the cup to be easily controlled.

The invention comprehends various features of advantage, all of which will clearly appear from the following description, in conjunction with the accompanying drawings, the novel features being pointed out in the claims at the end of the description.

In the drawings:

Figure 1 is a side elevation of a lubricator cup, showing the application of my invention in its preferred embodiment.

Figure 2 is an enlarged vertical sectional view taken centrally.

Figure 3 is a horizontal sectional view on the line 3—3 of Figure 1.

Figure 4 is a sectional view on line 4—4 of Figure 3, and

Figure 5 is a sectional view on line 5—5 of Figure 2, looking upwardly.

The invention is illustrated, as applied to a conventional form of lubricator cup, including the bottom 1, oil outlet 2, and central tubular support 3 having openings 4 through which oil passes from the cup to the outlet 2. Surrounding the central tubular support 3 is the side wall 5, which is usually made of glass, and rests upon the bottom 1.

6 designates the cover which is seated on the upper end of the side wall 5, and is provided with a non-circular opening at its center, such opening being preferably in the form of a double D. The cover 6 is adapted to receive in said opening a supporting collar 7, which retains the cover and has a non-circular and preferably double D-shaped exterior cross section corresponding with the opening in the cover, and cooperating therewith so as to prevent relative turning of the collar and cover when the parts are assembled as shown in Figure 2.

The supporting collar 7 is interiorly threaded, and at its lower end engages an exteriorly threaded portion on the upper end of the tubular support 3. The supporting collar 7 carries the valve mechanism, as will be described presently, and in assembling these parts, the supporting collar 7 is first inserted into the cover 6, and then by turning the cover, which can be easily engaged at its outer edge, the collar is likewise turned by reason of the non-rotative connection with the cover already described, and the collar is thus brought into attachment with the central tubular support and holds the cover in place. During such assembling, it is desirable to prevent separation of the supporting collar and cover and this is accomplished by movable or yieldable retaining means, as will now be described.

The collar 7 is provided with a shoulder or flanged portion 8 which overlies the outer face of the cover 6, and adjacent to the inner face of said cover, the collar 7 is provided with annular recesses 9. Mounted on the cover is a pivoted slide 10, which normally closes the filling opening 11, and is retained in its normal position by a coil spring 12. One end of the spring 12 is fixedly connected to the post 13 upon which the slide 10 is mounted, while the free end of said spring 12 engages one of said recesses 9 in the collar, as shown in Figures 4 and 5. In this manner, the spring 12 performs the double function of actuating the pivoted slide 10, and of locking the collar 7 in its normal relationship to the cover 6, so as to prevent separation of said parts.

The valve mechanism includes a valve rod 14, carried by a sleeve 15, the latter being exteriorly threaded, and engaging the upper end of the interiorly threaded collar 7. The valve rod 14, and the valve at the lower end thereof, are moved to open or closed position by the usual finger lever 16, and in order to adjust the degree of opening or closing of the valve, it is necessary to turn sleeve 15. To this end, the sleeve is provided with an operating device, preferably in the form of an integral knurled head or finger piece 17, and by turning the finger piece 17, the sleeve 15 is elevated or lowered within the collar 7, and with it the valve and its controlling lever 16. It is essential that the sleeve 15 be retained in its adjusted position, and this is preferably accomplished by a coil spring 18, located between the collar 7 and the finger piece 17, and exerting pressure in both directions. The finger piece 17 is provided with a pocket 19, and the collar 7 is provided with a pocket 20, to receive the corresponding ends of the spring 18, which bears with sufficient friction against the finger piece 17 to retain the sleeve 15 against accidental displacement.

Although the invention has been disclosed with reference to a particular embodiment, it is not limited to the precise construction set forth, and this application is intended to cover any modifications or departures that may properly come within the scope of the following claims.

I claim:

1. In a lubricator cup, the combination with a central tubular support and surrounding side wall, of a cover seated on said side wall and provided with a non-circular opening, a supporting collar engaging said opening and having a non-circular exterior cross section corresponding with said opening to prevent relative turning of the cover and collar, the supporting collar having attachment with said tubular support and provided with a portion overlying the cover, and valve mechanism carried by the collar.

2. In a lubricator cup, the combination with a central tubular support and surrounding side wall, of a cover seated on said side wall and provided with a non-circular opening, a supporting collar engaging said opening and having a non-circular exterior cross section corresponding with said opening to prevent relative turning of the cover and collar, the collar having a portion overlying the cover, movable retaining means acting to prevent separation of the cover and collar, the supporting collar having attachment with said tubular support, and valve mechanism carried by the collar.

3. In a lubricator cup, the combination with a central tubular support and surrounding side wall, of a cover seated on said side wall and provided with a non-circular opening, a supporting collar engaging said opening and having a non-circular exterior cross section corresponding with said opening to prevent relative turning of the cover and collar, a shoulder on the collar overlying the outer face of the cover, the collar having an annular recess adjacent to the inner face of the cover, yieldable means carried by the cover and engaging said recess to prevent separation of the collar, and cover, the collar having attachment with said tubular support, and valve mechanism carried by the collar.

4. In a lubricator cup, the combination with a central tubular support and surrounding side wall, of a cover seated on said side wall and provided with a non-circular opening, a supporting collar engaging said opening and having a non-circular exterior cross section corresponding with said opening to prevent relative turning of the cover and collar, a shoulder on the collar overlying the outer face of the cover, the collar having an annular recess adjacent to the inner face of the cover, a spring actuated slide carried by the cover, a spring arranged on the inner face of the cover and governing said slide, the free end of the spring engaging said recess and acting to prevent separation of the collar and cover, the collar having attachment with said tubular support, and valve mechanism carried by the collar.

5. In a lubricator cup, the combination with a tubular support and surrounding side wall, of a cover seated on the side wall, a supporting collar passing through the cover and having attachment with said tubular support, and valve mechanism including a sleeve having threaded engagement with said collar, an operating device on the sleeve for turning it to adjust the valve mechanism, and a coil spring located between said operating device and the said collar and acting to retain the sleeve frictionally in any adjusted position.

6. In a lubricator cup, the combination with a tubular support and surrounding side wall, of a cover seated on the side wall, a supporting collar passing through the cover and having attachment with said tubular support, and valve mechanism including a sleeve having threaded engagement with said collar, a finger piece carried by the sleeve for turning it to adjust the valve mechanism, said finger piece and said collar having pockets formed in their adjacent faces, and a spring located between the collar and finger piece and seated in said pockets, the spring acting to retain the sleeve frictionally in any adjusted position.

In witness whereof, I have hereunto signed my name.

CHARLES F. WRAY.